(12) United States Patent
Forrister (10) Patent No.: US 7,125,033 B2
(45) Date of Patent: Oct. 24, 2006

(54) TOWING APPARATUSES (76) Inventor: John J. Forrister, P.O. Box 8, Barstow, TX (US) 79719

( * ) Notice: Subject to any disclaimer, the term of this patent is extended or adjusted under 35 U.S.C. 154(b) by 91 days.

(21) Appl. No.: 10/940,827

(22) Filed: Sep. 14, 2004

(65) Prior Publication Data
US 2006/0055151 A1 Mar. 16, 2006

(51) Int. Cl.
B60D 1/14 (2006.01)
(52) U.S. Cl. .............. 280/416.2; 280/511; 280/508; 280/461.1; 280/460.1; 172/439; 172/449; 172/677
(58) Field of Classification Search ............ 280/416.2, 280/460.1, 461.1, 508, 511; 172/439, 449, 172/677
See application file for complete search history.

(56) References Cited

U.S. PATENT DOCUMENTS

| | | | |
|---|---|---|---|
| 3,759,548 A * | 9/1973 | Kothmann | 280/511 |
| 3,927,504 A | 12/1975 | Forrister | 53/21 FW |
| D243,759 S | 3/1977 | Utzinger et al. | D15/28 |
| 4,076,273 A | 2/1978 | Campion | 280/490 R |
| 4,214,776 A | 7/1980 | Nurse | 280/760 |
| 5,088,753 A | 2/1992 | Granata | 280/416.2 |
| D341,810 S | 11/1993 | Cordia | D12/162 |
| 5,690,182 A | 11/1997 | Ward | 172/439 |
| 5,730,227 A | 3/1998 | Hund | 172/439 |
| 5,947,503 A | 9/1999 | Tompkins | 280/455.1 |
| 5,984,019 A | 11/1999 | Hund | 172/439 |
| 6,125,945 A | 10/2000 | Skaggs et al. | 172/439 |
| 6,485,045 B1 | 11/2002 | King | 280/417.1 |
| 6,612,380 B1 | 9/2003 | Pyle | 172/439 |
| 6,695,338 B1 | 2/2004 | Roberts | 280/491.5 |

OTHER PUBLICATIONS 7 pages printed from http://www.tractorbynet.com/forums/showflat.php/Cat/0/Board/implement/Number/417654/page/0/view/collapsed/sb/5/o/fpart/fpart/2/vc/1 on Jun. 6, 2004.
7 pages printed from http://www.tractorbynet.com/forums/showflat.php/Cat/0/Board/implement/Number/417654/page/0/view/collapsed/sb/5/o/fpart/fpart/3/vc/1 on Jun. 6, 2004. with picture referenced by member Greg-g in post #418253—Apr. 29, 2004 07:57PM, and attachment referenced by user Egon in post #418453—Apr. 30, 2004 06:14AM.
7 pages printed from http://www.tractorbynet.com/forums/showflat.php/Cat/0/Board/implement/Number/417654/page/0/view/collapsed/sb/5/o/fpart/fpart/4/vc/1 on Jun. 6, 2003.
Picture located on the Internet less than one year before filing of this application. Length of time on the Internet is unknown.

(Continued)

Primary Examiner—Lesley D. Morris
Assistant Examiner—Marc A. Scharich
(74) Attorney, Agent, or Firm—Fubright & Jaworski L.L.P.

(57) ABSTRACT

Towing apparatuses suited for use with, for example, three-point hitches or quick hitches. At least some of the present towing apparatuses include a male hitch member that is positioned such that a force acting through the male hitch member (such as a force transmitted to the male hitch member through the female hitch member of the structure being towed) does not cause the particular towing apparatus to rotate about an axis along which the towing apparatus is pivotally coupled to a towing vehicle (such as through a three-point hitch or a quick hitch).

51 Claims, 6 Drawing Sheets

OTHER PUBLICATIONS 1 page printed from http://www.fallsplows.com/resource/truckmount/bumperjqc1.jpg on 30.

Walt's Tractor Parts, 3 pages printed from LLC Three Point Hitch Assemblies, http://www.waltstractors.com/acatalog/Walt_s_Tractor_Parts_Three_Point_Hitch_Assembly on Mar. 30, 2004.

BrandtPMC::Quick Hitches::Farm Products, 2 pages printed from http://www.brandtpmc.com/farm_products/quick_hitches.aspx, on Apr. 19, 2004.

Miscellaneous Loader Attachments, http://www.imac.ca/products/wlmiscella.htm.

Quick Coupler, Wheel Loader & Track Loader, 3 pages printed from http://www.imac.ca/products/wlquick.htm on Mar. 30, 2004.

3 Point Hitch Specifications and Definitions, 1 page printed from http://www.oktractor.com/3point.htm on Sep. 9, 2004.

6 pages printed form http://www.tractorbynet.com/forums/showflat.php/Cat/0/Board/implement/Number/417654/page/0/view/collapsed/sb/5/o/fpart/fpart/1/vc/1 on Jun. 6, 2004.

* cited by examiner

TOWING APPARATUSES

BACKGROUND

1. Field

The present towing apparatuses can be used to tow a variety of structures, including farm implements. Embodiments of the present towing apparatuses are well-suited to being pivotally connected to a three-point hitch (or to a quick hitch that is connected to a three-point hitch) of a tractor.

2. Description of Related Art

Tractors are used to pull a variety of different structures. Most are equipped with a three-point hitch in the rear, which is a mechanism that has two hydraulically operated arms that are spaced laterally from each other (sometimes referred to as "lift arms" or "hitch lifting arms"), and a third arm (sometimes referred to as the "top link") positioned above the other two. Structures to be trailered can be connected to 2 or more of the three arms either directly or through a towing apparatus of some kind. Alternatively, devices known in the art as "quick hitches" (e.g., element 40 in FIG. 13) can first be connected to the three-point hitch, and then the structure to be trailered (such as a farm implement) can be connected to the quick hitch through a towing apparatus.

One towing apparatus that can be connected directly to a three-point hitch or to a quick hitch that is connected to a three-point hitch is a straight bar (known in the art as a "drawbar"). Certain horizontal drawbars have a pin at each end, which makes the horizontal drawbar pivotally connectable to the lift arms of a three-point hitch or the two lower linkages of a quick hitch. A towing ball or any other suitable hitching structure (e.g., a clevis) can be connected to such horizontal drawbars.

Horizontal drawbars must be stabilized to keep them from rotating. An inverted V-shaped brace has been pinned to the horizontal drawbar and looped over the top link or hook of a quick hitch to achieve such stabilization. A device referred to in the art as a "drawbar lock" has also been connected to at least one of the lift arms of a three-point hitch and threaded over the horizontal drawbar for the same purpose.

SUMMARY

The present towing apparatuses may be described as drawbars that do not need a drawbar lock or an inverted V-brace to work properly.

Some embodiments of the present towing apparatuses include a main member; and a male hitch member connected to the main member. The male hitch member is configured for engagement with a female hitch member, and the towing apparatus is configured to be pivotally connected to a towing vehicle. The towing apparatus also is configured such that gravity alone can return the male hitch member to an upright position from a non-upright position.

Additional embodiments of the present towing apparatuses, and details associated with those embodiments, are described below.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality.

DESCRIPTION OF ILLUSTRATIVE EMBODIMENTS

The terms "comprise" (and any form of comprise, such as "comprises" and "comprising"), "have" (and any form of have, such as "has" and "having"), and "include" (and any form of include, such as "includes" and "including") are open-ended linking verbs. As a result, a towing apparatus that "comprises," "has," or "includes" one or more elements possesses those one or more elements, but is not limited to possessing only those one or more elements or steps. Likewise, an element of a towing apparatus that "comprises," "has," or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The term "substantially" is defined as at least close to (and includes) a given value or state (preferably within 10% of, more preferably within 1% of, and most preferably within 0.1% of). The term "towing apparatus" is defined as a structure that is useful for towing other structures.

Figure 1:
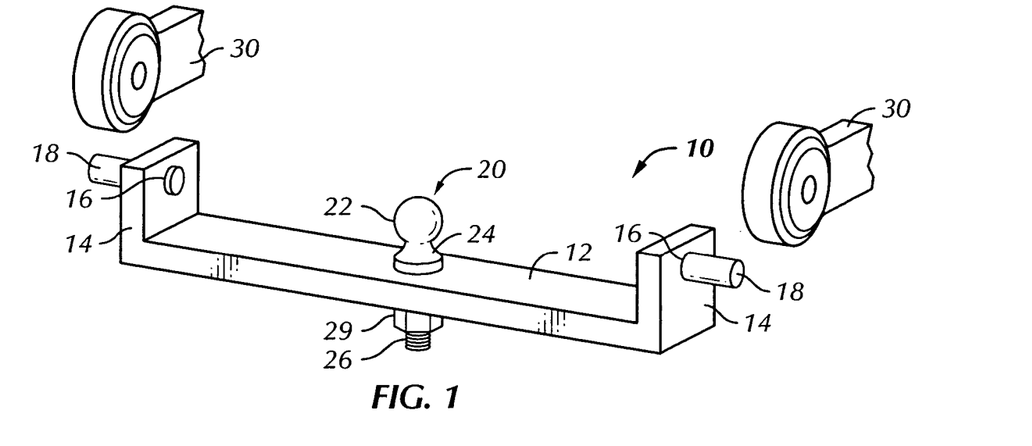
FIG. 1 is a perspective view of one embodiment of the present towing apparatuses.

One embodiment of the present towing apparatuses is the version of towing apparatus 10 shown in FIG. 1. Towing apparatus 10 includes main member 12 and arms 14, each of which extends from and is oriented substantially perpendicular to main member 12. Arms 14 therefore have at least a portion that is substantially perpendicular to main member 12. Each arm includes an opening 16 through which a portion of a pin 18 is positioned. The pins (sometimes referred to in the art as "draw pins") may have any outer configuration suited to a given application, such as cylindrical (as shown), which is especially suitable for use with three-point hitches and quick hitches. Towing apparatus 10 also includes a hitching structure 20, which is connected to main member 12. In the embodiment shown, hitching structure 20 is a standard towing ball that includes a male hitch member 22 (a ball portion in this embodiment), a flared base 24, a threaded shank 26, a washer 28 (labeled in FIG. 2) and a nut 29. Hitching structure 20 may also be a towing ball configured with a quick-change ball portion. Male hitch member 22 of hitching structure 20 may be characterized as being connected to main member 12.

Continuing with FIG. 1, male hitch member 22 is configured for engagement with a female hitch member (not shown), some of which are known in the art as "receivers." One type of "receiver" is a "towing ball receiver," which is one type of female hitch member that could engage the ball portion version of male hitch member 22 shown in the figures. The female hitch member with which male hitch member 22 may be configured for engagement can be part of virtually any type trailer, including farm implements, fifth wheel trailers or gooseneck trailers.

FIG. 1 also shows portions of two lift arms 30 of a three-point hitch (not shown). The presence of pins 18 is one configuration that makes towing apparatus 10 pivotally connectable to a towing vehicle, such as the vehicle (e.g., a tractor) to which lift arms 30 could be connected. Pins 18 also represent one configuration that makes towing apparatus 10 pivotally connectable to a towing vehicle, such as through a quick hitch 40 (FIG. 13) that is connected to a three-point hitch of a tractor.

Figure 2:
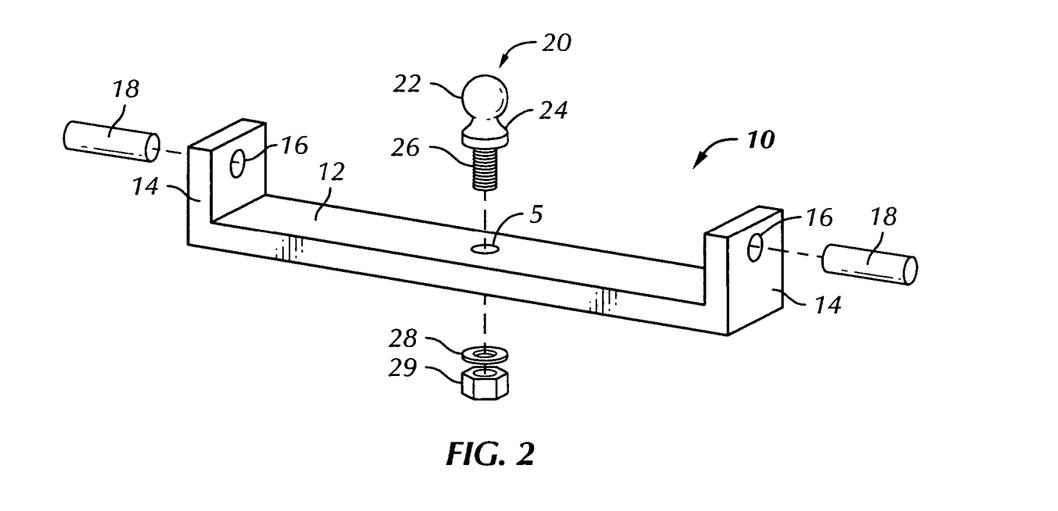
FIG. 2 is an exploded perspective view of the embodiment shown in FIG. 1.

FIG. 2 depicts the embodiment of towing apparatus 10 from FIG. 1 in exploded fashion. From FIG. 2 one of ordinary skill in the art will understand that one manner of connecting the depicted embodiment of male hitch member 22 to main member 12 is by placing shank 26 of hitching structure 20 through opening 5 provided in main member 12, and using washer 28 and nut 29 to secure flared base 24 against the top surface of main member 12.

Figure 3:
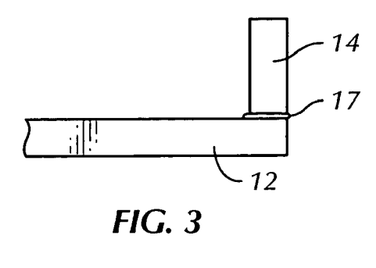
FIG. 3 is a partial front view of one embodiment of the present towing apparatuses, showing that one of the present arms may be welded to one of the present main members.
Figure 4:
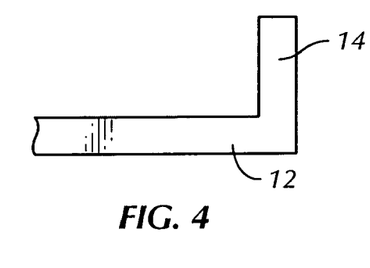
FIG. 4 is a partial front view of one embodiment of the present towing apparatuses, showing that one of the present arms may be integral with one of the present main members.

FIGS. 3 and 4 are partial views of portions of different embodiments of towing apparatus 10. Either or both of arms 14 may be connected to main member 12 in any suitable fashion, such as through the use of one or more welds 17 (FIG. 3), one or more bolts (not shown), etc. Either or both of arms 14 also may be integral with main member 12, as can be achieved through, for example, forging (e.g., drop forging) one or both of arms 14 and main member 12 from a single piece of material (FIG. 4).

Figure 5A:
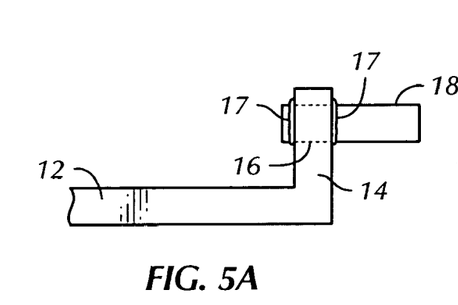
FIG. 5A is a partial front view of one embodiment of the present towing apparatuses, showing that one of the present pins may be threaded through an opening in and then welded to one of the present arms.
Figure 5B:
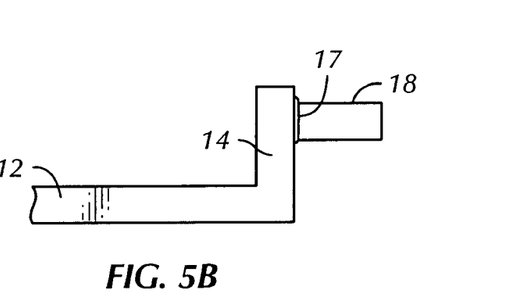
FIG. 5B is a partial front view of one embodiment of the present towing apparatuses, showing that one of the present pins may be butted against an outer surface of and then welded to one of the present arms.

FIG. 5A shows that in embodiments of the present towing apparatuses where an opening 16 is provided in a given arm 14, and a pin 18 is threaded through the opening such that a portion of the pin is positioned in the opening, one or more welds 17 may be used to connect pin 18 to arm 14. FIG. 5B shows that in embodiments of the present towing apparatuses where a given arm 14 is not provided with an opening 16, a pin 18 may still be connected to the arm by butting pin 18 against an outer surface of the arm and using one or more welds 17 to make the connection.

Figure 6:
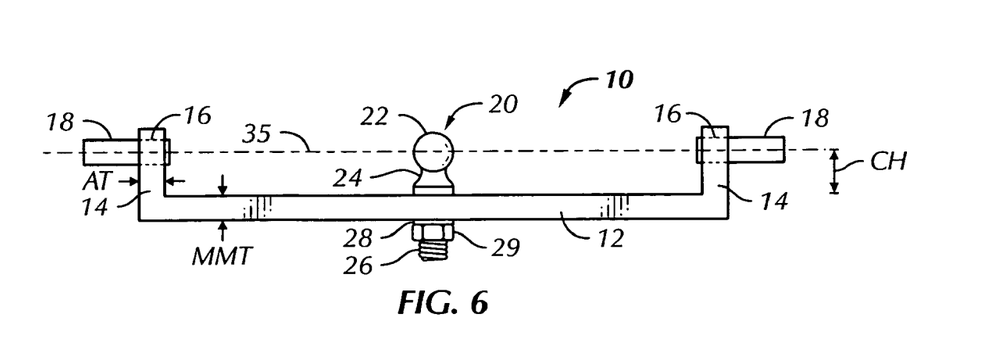
FIGS. 6 and 7 are front and top views, respectively, of the embodiment of the present towing apparatuses shown in FIG. 1.
Figure 7:
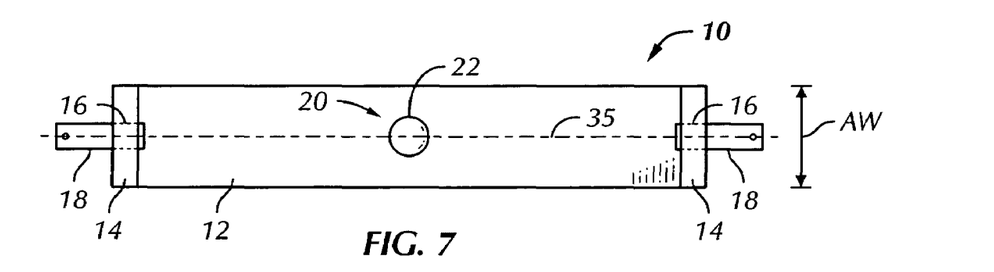

A given pin 18 may be connected to an arm 14 by utilizing a press fit. Furthermore, a given pin 18 may be connected to an arm 14 by heat shrinking. For example, the arm may be heated, a pin 18 placed through the opening in it, and the arm then allowed the arm to cool and shrink and become connected to the pin by virtue of the resulting friction between them. FIGS. 6 and 7, which are front and top views, respectively, of the embodiment of towing apparatus 10 shown in FIGS. 1 and 2, illustrate an example of such a connection. Press fitting or heat shrinking may be used in combination with welding.

Figure 8:
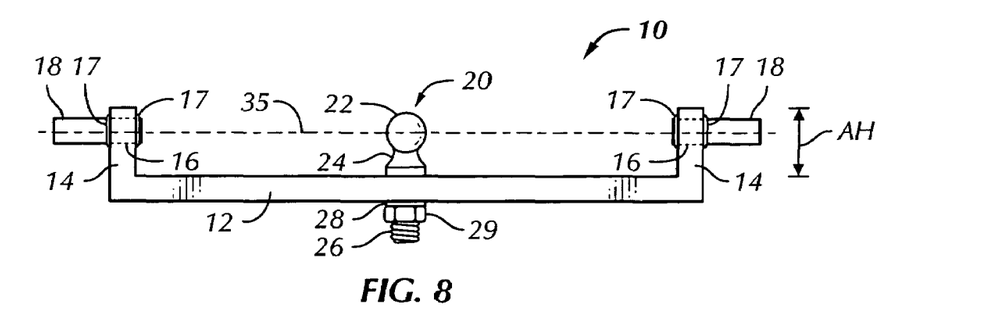
FIGS. 8 and 9 are front and top views, respectively, of another embodiment of the present towing apparatuses.
Figure 9:
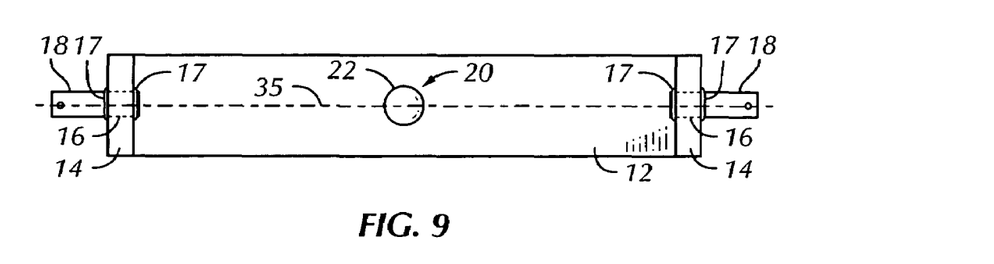
Figure 12:
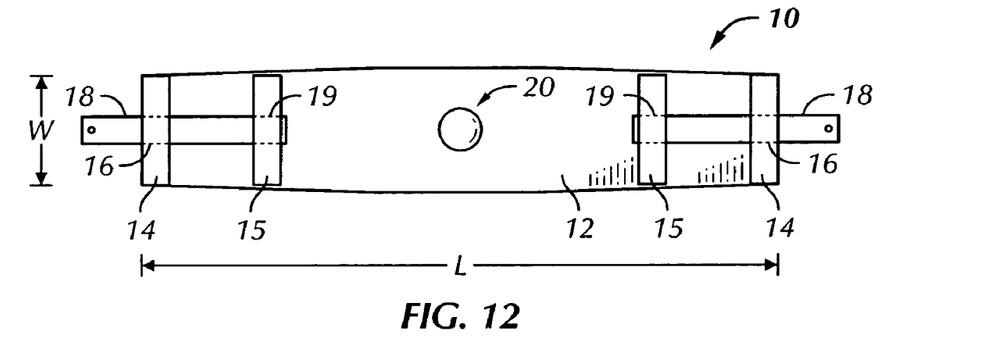
FIG. 12 is a top view of the embodiment of the present towing apparatuses shown in FIG. 11.

FIGS. 6 and 7 also show an axis 35 along which towing apparatus 10 can pivot when it is pivotally connected to a towing vehicle (such as a tractor or a truck). These figures show that male hitch member 22 of hitching structure 20 is positioned above main member 12 such that axis 35, which passes through openings 16 in arms 14, also passes through male hitch member 22. FIGS. 8 and 9 depict an embodiment of towing apparatus 10 that differs from the embodiment shown in FIGS. 6 and 7 only by virtue of the welds 17 used to connect pins 18 to arms 14. FIGS. 7, 9 and 12 show a small, unlabeled opening in each pin 18 through which a snap ring can be placed to help keep towing apparatus 10 in place when connected to, e.g., a quick hitch or three-point hitch.

Figure 10:
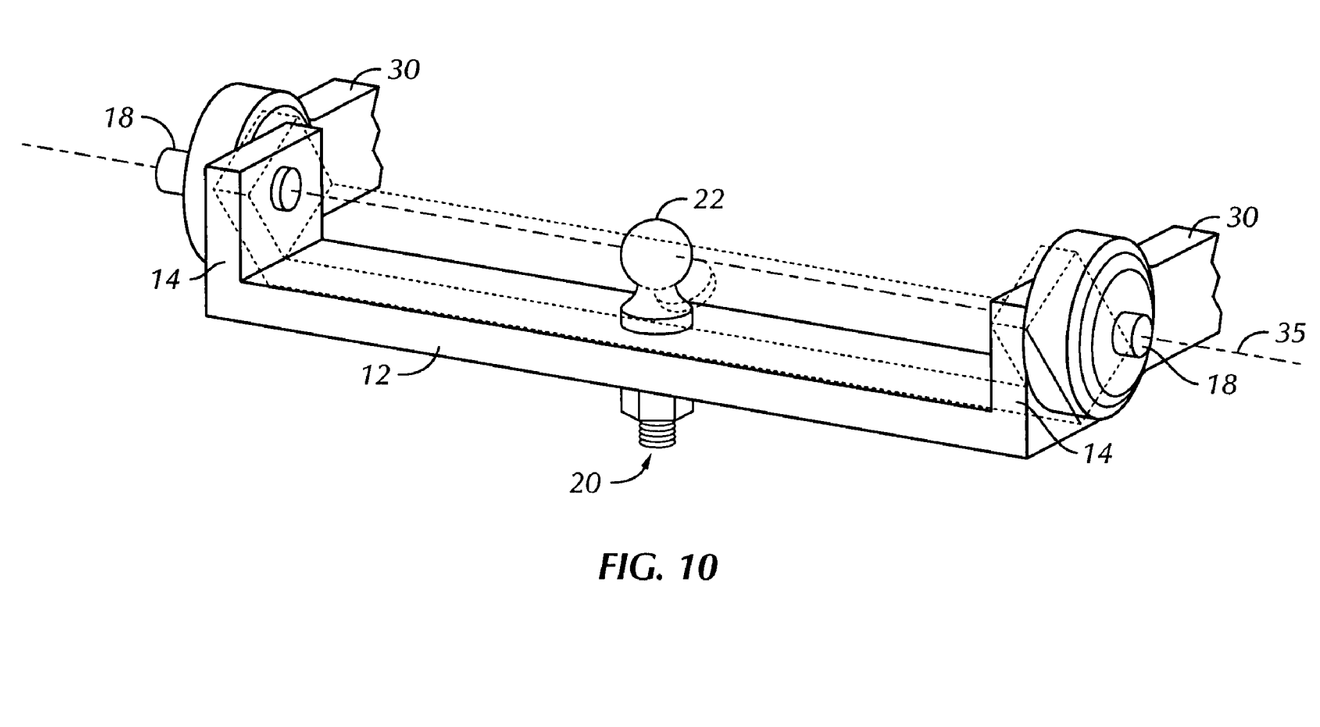
FIG. 10 is a perspective view of the embodiment of the present towing apparatuses shown in FIG. 1 being pivotally coupled to the lift arms of a three-point hitch.

FIG. 10 illustrates the result of configuring towing apparatus 10 as shown in FIGS. 1, 2 and 6–9. The version of towing apparatus 10 shown in FIG. 10 is pivotally connected to (and thus is configured to be pivotally connected to) a towing vehicle (not shown) through two lift arms 30 of a three-point hitch. This figure shows that when male hitch member 22 is moved for whatever reason into a non-upright position—represented in phantom by dashed lines—the configuration of the embodiment of towing apparatus 10 that is shown is such that gravity alone can and will return male hitch member 22 to an upright position when the force or forces holding the male hitch member in the non-upright position are removed. Depending on the size of the towing apparatus and the amount of friction force that exists between pins 18 and the lifting arms 30 of the three-point hitch, the towing apparatus may swing past an upright position to another non-upright position (like a pendulum). Nevertheless, gravity alone will still return the male hitch member to the upright position shown in FIG. 10, and this will occur no matter the angle between lifting arms 30 of the three-point hitch and arms 14. The heavier towing apparatus 10 is, the more stable it will be.

The configuration just described can be achieved by positioning the height of male hitch member 22 such that an axis (such as axis 35) that passes through (a) the openings (when openings are used) in the arms of the towing apparatus and/or (b) the pins connected to the arms, also passes through the male hitch member 22. Preferably, the axis is as centered through the male hitch member as possible. Axis 35 may be off-center vertically (see FIG. 6) and/or laterally (see FIGS. 7 and 9) to some degree, and the same result will follow. The inventor believes that a deviation of about 10% or less from center (vertically and/or laterally) will still suffice. The embodiments of towing apparatus 10 shown in FIGS. 1, 2 and 6–13 are all examples of towing apparatuses that are configured such that gravity alone can return the depicted male hitch members to an upright position from a non-upright position.

The embodiments of towing apparatus 10 shown in FIGS. 1, 2 and 6–13 are also all examples of towing apparatuses having male hitch members that are positioned relative to an axis (e.g., axis 35) extending through the arms of the towing apparatus such that when the towing apparatus is used in towing a structure—such as a farm implement—the towing apparatus has substantially no tendency to rotate about that axis. In contrast, a horizontal drawbar that is not stabilized with a structure such as a drawbar lock or an inverted V-brace has a tendency to rotate when force is applied through, for example, the towing ball connected to and projecting up from the horizontal drawbar.

Substantially centering the axis that passes through (and, more specifically, that may be centered within and extends through the length of) pins 18 (e.g., axis 35) within male hitch member 22 of the embodiments of the towing apparatuses 10 depicted in the present figures is one way to (a) configure those towing apparatuses such that gravity alone can return the depicted male hitch members to an upright position from a non-upright position, and (b) position male hitch member 22 relative to that axis or to the main member such that when the particular towing apparatus is used in towing an implement, the towing apparatus has substantially no tendency to rotate about that axis. Furthermore, while arms 14 shown in the present figures are oriented substantially perpendicularly to main member 12, they need not be. Arms 14 may be at any angle relative to main member 12 provided pins 18 are configured in such a way that allows the towing apparatus in question to be pivotally coupled to a towing vehicle (e.g., through a three-point hitch or a quick hitch).

A force acting through a female hitch member (such as a towing ball receiver) on the embodiment of male hitch member 22 shown in the figures has substantially no moment arm relative to the axis (e.g., axis 35) around which any rotation would take place because male hitch member 22 is positioned relative to axis 35 such that the force acting through male hitch member 22 is effectively substantially aligned with axis 35. When the ball portion of a towing ball is used as male hitch member 22, there may be forces acting both above and below axis 35 (all in directions that are roughly opposite the direction the towing vehicle will be moving), in addition to those forces acting through axis 35. However, provided the forces acting above axis 35 are substantially equal to the forces acting below axis 35, and provided the moment arms of those forces are substantially the same, substantially the same result will be achieved: the particular embodiment of towing apparatus 10 being used will have substantially no tendency to rotate about axis 35 during use.

Another manner of achieving the result just described is to configure the towing apparatus in question such that a force acting through the male hitch member substantially passes through an axis (the "contact" axis) connecting two points where the force transmitted by the trailered structured (e.g., a farm implement) contacts the towing vehicle (or a quick hitch or the like connected to the towing vehicle). In such a configuration, the contact axis need not pass through or otherwise be substantially centered within the male hitch member.

Figure 11:
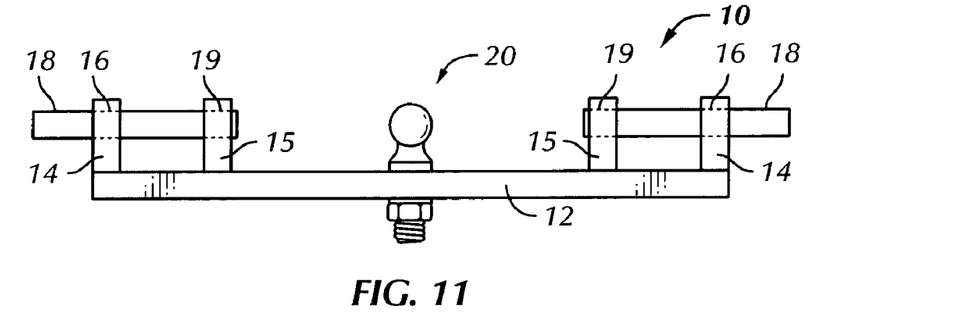
FIG. 11 is a front view of an embodiment of the present towing apparatuses that includes pin support members.

FIGS. 11 and 12 show another embodiment of towing apparatus 10. This embodiment includes two pin support members 15, which can be connected to main member 12 in any suitable fashion, including through the use of welds (not shown). As shown, pin support members 15 can be oriented substantially perpendicularly to main member 12. They may also each have an opening 19 in them through which a given pin may be placed and in which a portion of that pin may be positioned. Although two pin support members are shown in FIGS. 11 and 12, as many as are suited to given application can be used. Furthermore, a given pin support member may be spaced apart from an adjacent arm by any suitable distance suited for the application, including a distance that allows a user's hand to fit between them. FIG. 12 also shows that embodiments of main member 12 can have a width W that varies along the length L of the main member. In this particular embodiment, the width W is greatest near the center of the length L of the main member.

Figure 14:
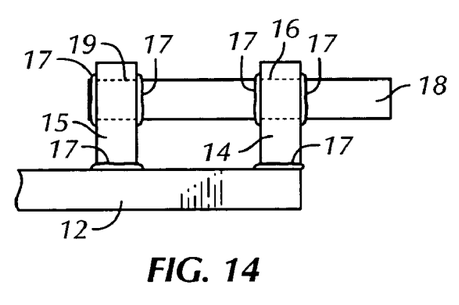
FIG. 14 is a partial front view showing that one of the present arms and one of the present pin support members may be welded to one of the present main members.
Figure 15:
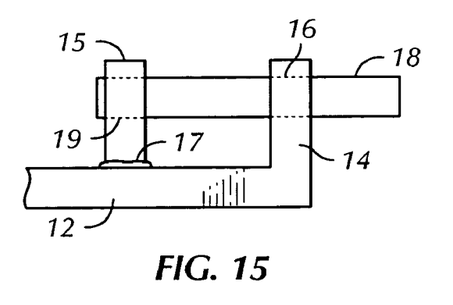
FIG. 15 is a partial front view showing that one of the present pin support members may be welded to one of the present main members that is integral with one of the present arms.

The pin support members may be connected to the pins as discussed above (e.g., through welding, heat shrinking, and/or press fitting). FIG. 14 is a partial view showing a portion of a main member 12 to which both an arm 14 and a pin support member 15 have been welded. This figure also shows that pin 18 can be connected to both the arm and the pin support member through welds 17. FIG. 15 shows that pin support members 15 may be used with embodiments of the present towing apparatuses that have one or more arms 14 that are integral with main member 12.

Figure 13:
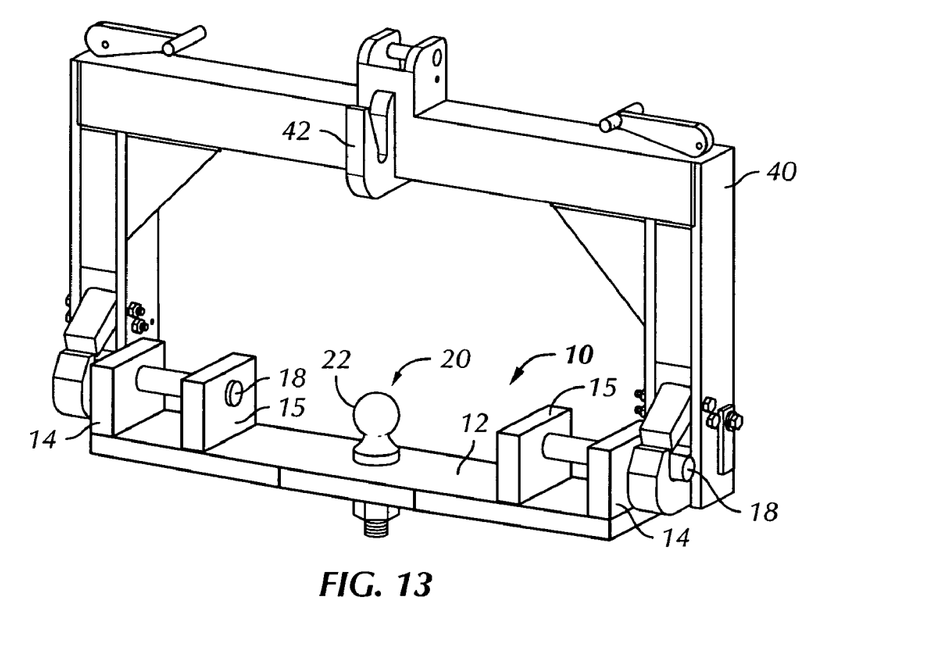
FIG. 13 is a perspective view of one of the present towing apparatuses pivotally coupled to a quick hitch.

FIG. 13 is a perspective view showing one embodiment of towing apparatus 10 pivotally connected to a quick hitch 40. Because mail hitch member 22 is positioned such that an axis passing through pins 18 is substantially centered within male hitch member 22, the embodiment of towing apparatus 10 shown will have substantially no tendency to rotate about that axis when used to tow a structure such as a farm implement. As a result, there is no need to attach a stabilizing structure—like an inverted V-brace—to towing apparatus 10 and top hook 42 of quick hitch 40. The ease and quickness with which all of the embodiments of towing apparatus 10 shown in the figures can be connected to a towing vehicle—whether through a quick hitch, the lift arms of a three-point hitch, or any other structure having two connection points—and then put to use are increased over horizontal drawbars that must be stabilized before being used.

There are at least 4 categories of three-point hitches as set by the International Standards Organization. They are generally referred to as categories 0–III, and some of the categories can be standard, wide (W) or narrow (N). Category IV three-point hitches also exist in the industry. An embodiment of the present towing apparatuses can be configured for use with any category of three-point hitch. Category zero (0) three-point hitches are intended for tractors capable of generating up to 20 horsepower (HP). The pins 18 used with an embodiment of the present towing apparatuses that is sized to be coupled to a category 0 three-point hitch can have a diameter of ⅝ inches. Category I three-point hitches are intended for tractors capable of generating from 20 to 45 HP. The pins 18 used with an embodiment of the present towing apparatuses that is sized to be coupled to a category I three-point hitch can have a diameter of ⅞ inches. Category II three-point hitches are intended for tractors capable of generating from 55 to 95 HP. The pins 18 used with an embodiment of the present towing apparatuses that is sized to be coupled to a category II three-point hitch can have a diameter of 1⅛ inches. Category III three-point hitches are intended for tractors capable of generating more than 95 horsepower HP. The pins 18 used with an embodiment of the present towing apparatuses that is sized to be coupled to a category III three-point hitch can have a diameter of 1 7/16 inches. Some category IV N three-point hitches can withstand the forces applied by tractors capable of generating 500 HP. The pins 18 used with an embodiment of the present towing apparatuses that is sized to be coupled to a category IV N three-point hitch can have a diameter of 2 inches.

The present towing apparatuses may be sized to best fit a given application, and may be made from any material suited to the application. Main member 12, arms 14, pin support members 15 (when used), and pins 18 may all be made of any suitable material capable of withstanding the forces that will result from the towing. Hot-rolled steel (mild steel) will be suitable for most applications. A suitable grade is ASTM A-36. Cold rolled (CF steel) will also be suitable for most applications. Suitable grades are SAE 1018–1020. Alloy steels, such as grades AISI 4130 and 4140, will be suitable for most applications. Generally, steels having a tensile strength of at least 60,000 pounds per square inch are desirable. The material from which scraper blades are made is another example of suitable material. For instance, scraper blade material that is treated for anti-wear and has a grade of AR 250, AR 350, or AR 450 may be used. In addition to the materials just listed, milled steel rods are examples of materials that may be used for pins 18.

An exemplary thickness MMT (see FIG. 6) for a main member 12 that is part of an embodiment of towing apparatus 10 intended for use with a category III three-point hitch is 1 inch. An exemplary width W for such a main member is 4 inches to 6 inches. (For main members that taper toward the ends (see FIG. 12), W can be 6 inches in the middle and taper to 4 inches at the ends.) An exemplary length L for such a main member is 38 inches (for category 0, L can be 20 inches; for category I, L can be 26 inches; for category II, L can be 32 inches; for category IV N, L can be 38 inches). An exemplary thickness AT for an arm 14 that is part of an embodiment of towing apparatus 10 intended for use with a category III three-point hitch is 1 inch. An exemplary width AW (see FIG. 7) for such an arm is 4 inches. An exemplary height AH (see FIG. 8) for such an arm is 4 inches. An exemplary thickness, width and height (taken from the same perspective as the same dimensions of an arm) for a pin support member configured for use with such a towing apparatus are: 1 inch, 4 inches and 4 inches. An exemplary distance between an arm and a pin support member for such a towing apparatus is 5 inches. Pins 18 configured for use with such a towing apparatus may be 2 inches in diameter and 4–6 inches long when no pin support members are used. Generally, at least about 3 inches of each pin should extend beyond the arms of the towing apparatus. Bushings should be used in conjunction with pins 18, as those of ordinary skill in the art will understand. A towing ball suited for use as hitching structure 20 of such a towing apparatus may be 2 5/16 inches in diameter, and may be connected to a shank having a 1-inch or 1 1/4-inch diameter shaft and a length of about 2 1/4 inches. A towing ball suited for use as hitching structure 20 of a towing apparatus configured for small loads (such as might be pulled by small tractors or four wheelers) may be 1 7/8 inches in diameter, and may have a 3/4-inch or 7/8-inch diameter shank. A towing ball suited for use as hitching structure 20 of a towing apparatus configured for larger loads may be 2 inches in diameter, and may have a 1-inch or 1 1/4-inch diameter shank. An exemplary height CH (see FIG. 6) for the distance between the top of main member 12 and the center of a towing ball version of male hitch member 22 is about 2 1/2 inches.

It should be understood that the present towing apparatuses are not intended to be limited to the particular forms disclosed. Rather, they are to cover all modifications, equivalents, and alternatives falling within the scope of the claims. For example, although the present towing apparatuses have been illustrated and described as working well with quick hitches and three-point hitches, those of ordinary skill in the art will understand that the present towing apparatuses can be connected (e.g., pivotally) to any structure with two connection points. As a result, they can be used in truck or trailer beds as part of a hitch mechanism for connection to a gooseneck trailer or a fifth wheel. Furthermore, while the shapes of the arms and pin support members have been shown as rectangular, any suitable shape may be used. Additionally, while main member 12 has been shown as being flat and straight, it may have any suitable configuration provided male hitch member 22 is positioned as described. Thus, while perhaps more difficult to manufacture, main member 12 could have a curved shape (like the seat of a swing) provided male hitch member 22 could be connected to it as described above. Furthermore, multiple openings 5 could be provided in main member 12, such that hitching structure 20 could be placed anywhere along the length of main member 12.

The claims are not to be interpreted as including means-plus- or step-plus-function limitations, unless such a limitation is explicitly recited in a given claim using the phrase(s) "means for" or "step for," respectively.

I claim:

1. A towing apparatus comprising:
   a main member;
   a first arm oriented substantially perpendicular to the main member, the first arm including an opening;
   a second arm oriented substantially perpendicular to the main member, the second arm including an opening; and
   a male hitch member connected to the main member, the male hitch member being configured for engagement with a female hitch member, the male hitch member being positioned above the main member such that an axis that passes through the openings of the first and second arms also passes through the male hitch member;
   the towing apparatus being configured to be pivotally coupled to a towing vehicle.

2. The towing apparatus of claim 1, where the first arm is welded to the main member.

3. The towing apparatus of claim 2, where the second arm is welded to the main member.

4. The towing apparatus of claim 1, where the first arm, main member and second arm are forged from a single piece of material.

5. The towing apparatus of claim 1, further comprising:
   a first pin having a portion positioned in the opening of the first arm; and
   a second pin having a portion positioned in the opening of the second arm.

6. The towing apparatus of claim 5, where the first pin is welded to the first arm.

7. The towing apparatus of claim 6, where the second pin is welded to the second arm.

8. The towing apparatus of claim 5, further comprising:
   a first pin support member extending from the main member.

9. The towing apparatus of claim 8, further comprising:
   a second pin support member extending from the main member.

10. The towing apparatus of claim 1, where the male hitch member is the ball portion of a towing ball.

11. The towing apparatus of claim 1, where the main member has (a) a length and (b) a width that varies along the length.

12. The towing apparatus of claim 1, where the towing apparatus is sized to be coupled to a tractor capable of generating up to 20 horsepower.

13. The towing apparatus of claim 1, where the towing apparatus is sized to be coupled to tractor capable of generating from 20 to 45 horsepower.

14. The towing apparatus of claim 1, where the towing apparatus is sized to be coupled to tractor capable of generating from 55 to 95 horsepower.

15. The towing apparatus of claim 1, where the towing apparatus is sized to be coupled to a tractor capable of generating more than 95 horsepower.

16. A towing apparatus comprising:
a main member; and
a male hitch member connected to the main member, the male hitch member being configured for engagement with a female hitch member;
the towing apparatus being configured to be pivotally connected to a towing vehicle, the towing apparatus also being configured such that gravity alone can return the male hitch member to an upright position from a non-upright position.

17. The towing apparatus of claim 16, the male hitch member is the ball portion of a towing ball.

18. The towing apparatus of claim 16, the main member having (a) a length and (b) a width that varies along the length.

19. The towing apparatus of claim 16, where the towing apparatus is sized to be coupled to a tractor capable of generating up to 20 horsepower.

20. The towing apparatus of claim 16, where the towing apparatus is to be coupled to tractor capable of generating from 20 to 45 horsepower.

21. The towing apparatus of claim 16, where the towing apparatus is to be coupled to tractor capable of generating from 55 to 95 horsepower.

22. The towing apparatus of claim 16, where the towing apparatus is to be coupled to a tractor capable of generating more than 95 horsepower.

23. A towing apparatus comprising:
a main member;
two arms connected to the main member;
a male hitch member connected to the main member, the male hitch member being configured for engagement with a female hitch member; and
an axis extending through both arms;
the male hitch member being positioned relative to the axis such that when the towing apparatus is pivotally coupled to a towing vehicle and used in towing an implement, the towing apparatus has substantially no tendency to rotate about the axis.

24. The towing apparatus of claim 23, where one of the two arms is welded to the main member.

25. The towing apparatus of claim 24, where the other arm is welded to the main member.

26. The towing apparatus of claim 23, where the two arms and main member are forged from a single piece of material.

27. The towing apparatus of claim 23, further comprising:
a first pin having a portion positioned in an opening in one of the two arms; and
a second pin having a portion positioned in an opening in the other arm.

28. The towing apparatus of claim 23, further comprising:
a first pin welded to one of the two arms.

29. The towing apparatus of claim 28, further comprising:
a second pin welded to the other arm.

30. The towing apparatus of claim 27, further comprising:
a first pin support member extending from the main member.

31. The towing apparatus of claim 30, further comprising:
a second pin support member extending from the main member.

32. The towing apparatus of claim 23, where the male hitch member is the ball portion of a towing ball.

33. The towing apparatus of claim 23, where the main member has (a) a length and (b) a width that varies along the length.

34. The towing apparatus of claim 23, where the towing apparatus is sized to be coupled to a tractor capable of generating up to 20 horsepower.

35. The towing apparatus of claim 23, where the towing apparatus is sized to be coupled to tractor capable of generating from 20 to 45 horsepower.

36. The towing apparatus of claim 23, where the towing apparatus is sized to be coupled to tractor capable of generating from 55 to 95 horsepower.

37. The towing apparatus of claim 23, where the towing apparatus is sized to be coupled to a tractor capable of generating more than 95 horsepower.

38. A towing apparatus comprising:
a main member;
two arms connected to the main member; and
a towing ball connected to the main member between the two arms, the towing ball having a ball portion that is positioned such that when the towing apparatus is (a) pivotally connected to a towing vehicle along an axis, and (b) used to tow an implement, the towing apparatus has substantially no tendency to rotate about the axis due to a pulling force of the towing vehicle.

39. The towing apparatus of claim 38, where one of the two arms is welded to the main member.

40. The towing apparatus of claim 39, where the other arm is welded to the main member.

41. The towing apparatus of claim 38, where the two arms and main member are forged from a single piece of material.

42. The towing apparatus of claim 38, further comprising:
a first pin having a portion positioned in an opening in one of the two arms; and
a second pin having a portion positioned in an opening in the other arm.

43. The towing apparatus of claim 38, further comprising:
a first pin welded to one of the two arms.

44. The towing apparatus of claim 43, further comprising:
a second pin welded to the other arm.

45. The towing apparatus of claim 42, further comprising:
a first pin support member extending from the main member.

46. The towing apparatus of claim 45, further comprising:
a second pin support member extending from the main member.

47. The towing apparatus of claim 38, where the main member has (a) a length and (b) a width that varies along the length.

48. The towing apparatus of claim 38, where the towing apparatus is sized to be coupled to a tractor capable of generating up to 20 horsepower.

49. The towing apparatus of claim 38, where the towing apparatus is sized to be coupled to tractor capable of generating from 20 to 45 horsepower.

50. The towing apparatus of claim 38, where the towing apparatus is sized to be coupled to tractor capable of generating from 55 to 95 horsepower.

51. The towing apparatus of claim 38, where the towing apparatus is sized to be coupled to a tractor capable of generating more than 95 horsepower.

* * * * *